United States Patent
Shao et al.

(10) Patent No.: US 11,959,789 B2
(45) Date of Patent: Apr. 16, 2024

(54) METHODS, SYSTEMS, AND MEDIUM FOR COMPENSATING ULTRASONIC METERING BASED ON A SMART GAS INTERNET OF THINGS SYSTEM

(71) Applicant: CHENGDU QINCHUAN IOT TECHNOLOGY CO., LTD., Sichuan (CN)

(72) Inventors: Zehua Shao, Chengdu (CN); Yaqiang Quan, Chengdu (CN); Junyan Zhou, Chengdu (CN); Feng Wang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/340,856

(22) Filed: Jun. 24, 2023

(65) Prior Publication Data
US 2023/0332938 A1 Oct. 19, 2023

(30) Foreign Application Priority Data
May 30, 2023 (CN) .......................... 202310618611.1

(51) Int. Cl.
*G01F 15/04* (2006.01)
*G01F 1/66* (2022.01)

(52) U.S. Cl.
CPC .............. *G01F 15/046* (2013.01); *G01F 1/66* (2013.01)

(58) Field of Classification Search
None
See application file for complete search history.

(56) References Cited

FOREIGN PATENT DOCUMENTS

| CN | 1802489 A | 7/2006 |
|---|---|---|
| CN | 104250685 A | 12/2014 |
| CN | 103808381 B | 6/2016 |
| CN | 107204074 A | 9/2017 |
| CN | 107809460 A | 3/2018 |
| CN | 105091970 B | 6/2018 |
| CN | 111256790 A | 6/2020 |
| CN | 115773797 A | 3/2023 |
| JP | 2000171102 A | 6/2000 |
| JP | 2021001713 A | 1/2021 |

*Primary Examiner* — Harshad R Patel
(74) *Attorney, Agent, or Firm* — METIS IP LLC

(57) ABSTRACT

The embodiments of the present disclosure provide a method and system for compensating ultrasonic metering based on a smart gas Internet of Things system, comprising: determining a first preset condition based on a gas pipeline feature obtained from an external database, wherein the first preset condition refers to a judgment condition for evaluating whether a flow compensation is required; obtaining a gas transportation feature and an environmental feature based on at least one sensor; determining a compensation scheme based on the gas transportation feature, the environmental feature, and the first preset condition, wherein the compensation scheme includes at least one of a flow rate compensation coefficient, a flow compensation parameter, a temperature compensation coefficient, or a pressure compensation coefficient; sending the compensation scheme to an ultrasonic metering device, and controlling the ultrasonic metering device to determine updated flow metering data according to the compensation scheme.

10 Claims, 5 Drawing Sheets

200

210 — Determining a first preset condition based on a gas pipeline feature obtained from an external database 220 — Obtaining a gas transportation feature and an environmental feature based on at least one sensor 230 — Determining a compensation scheme based on the gas transportation feature, the environmental feature, and the first preset condition 240 — Sending the compensation scheme to an ultrasonic metering device to control the ultrasonic metering device to determine updated flow metering data according to the compensation scheme

310
Obtaining target monitoring data at a target time point, a first monitoring data sequence within a first preset time period, and a second monitoring data sequence within a second preset time period 320
Judging whether the target monitoring data being interference data based on the first monitoring data sequence and the second monitoring data sequence 330
Processing the interference data in response to the target monitoring data being the interference data

FIG.3

METHODS, SYSTEMS, AND MEDIUM FOR COMPENSATING ULTRASONIC METERING BASED ON A SMART GAS INTERNET OF THINGS SYSTEM

CROSS-REFERENCE TO RELATED APPLICATIONS

This application claims priority of Chinese Patent Application No. 202310618611.1, filed on May 30, 2023, the entire contents of which are incorporated herein by reference.

TECHNICAL FIELD

The present disclosure relates to the field of an ultrasonic metering device, and in particular, to a method, system, and medium for compensating ultrasonic metering based on a smart gas Internet of Things system.

BACKGROUND

When an ultrasonic wave propagates in fluid, it will be affected by a flow rate of the fluid. By detecting the received ultrasonic wave, the flow rate of the fluid can be detected and converted into a flow rate. A propagation speed of the ultrasonic wave in the fluid is directly involved in a calculation to obtain flow rate information as a known constant. However, the propagation speed of the ultrasonic wave in the fluid changes with a change of temperature, when a temperature range of the fluid is relatively large, impact of changes in the propagation speed of the ultrasonic wave is not negligible.

In the prior art, a flow compensation is mostly calculated based on a monitored temperature difference, a flow rate difference, etc. Chinese Patent No. 105091970B uses a dynamic compensation method to compensate a temperature difference in a pipeline, but does not involve a problem of fluid temperature stratification in the pipeline. Chinese Patent No. 103808381B determines a temperature compensation formula through fitting and does not involve the problem of fluid temperature stratification in the pipeline, and there may still be non-negligible errors in a flow metering result after correction.

Therefore, it is hoped to provide a method, system, and medium for compensating ultrasonic metering based on a smart gas Internet of Things system to evaluate a temperature stratification in the pipeline and determine a more accurate and reliable flow compensation coefficient, so as to improve the accuracy of an ultrasonic metering device.

SUMMARY

Therefore, the embodiments of the present disclosure provide a method, system, and medium for compensating ultrasonic metering based on a smart gas Internet of Things system to solve an impact of a temperature stratification in a pipeline that changes a propagation speed of an ultrasonic wave.

One of the embodiments of the present disclosure provides a method for compensating ultrasonic metering based on a smart gas Internet of Things system, wherein the method is implemented based on a system for compensating ultrasonic metering and executed by a smart gas device management platform, comprising: determining a first preset condition based on a gas pipeline feature obtained from an external dataset, and the first preset condition refers to a judgment condition for evaluating whether a flow compensation is required; obtaining a gas transportation feature and an environmental feature based on at least one sensor; determining a compensation scheme based on the gas transportation feature, the environmental feature, and the first preset condition, the compensation scheme includes at least one of a flow rate compensation coefficient, a flow compensation parameter, a temperature compensation coefficient, or a pressure compensation coefficient; and sending the compensation scheme to an ultrasonic metering device, and controlling the ultrasonic metering device to determine updated flow metering data according to the compensation scheme.

One of the embodiments of the present disclosure provides a system for compensating ultrasonic metering based on a smart gas Internet of Things system, wherein the system includes a smart gas user platform, a smart gas service platform, a smart gas device management platform, a smart gas sensor network platform, and a smart gas object platform; the smart gas user platform is configured to send a query instruction of parameter management information of a gas device to the smart gas device management platform through the smart gas service platform; the smart gas device management platform is configured to send an instruction for obtaining relevant data on the gas device to the smart gas object platform through the smart gas sensor network platform in response to the query instruction of the parameter management information of the gas device, receive relevant data on the gas device uploaded by the smart gas object platform; process the relevant data on the gas device to obtain management information of the gas device; and upload the management information of the gas device to the smart gas user platform through the smart gas service platform; the relevant data on the gas device at least includes a gas pipeline feature, a gas transportation feature, and an environmental feature, and the management information of the gas device at least includes the compensation scheme for compensating the flow metering data of the ultrasonic metering device, and a process of determining the compensation scheme includes: determining a first preset condition based on a gas pipeline feature obtained from an external database, and the first preset condition refers to a judgement condition for evaluating whether a flow compensation is required; obtaining a gas transportation feature and an environmental feature based on at least one sensor; determining the compensation scheme based on the gas transportation feature, the environmental feature, and the first preset condition, and the compensation scheme includes at least one of a flow rate compensation coefficient, a flow compensation parameter, a temperature compensation coefficient, or a pressure compensation coefficient.

One of the embodiments of the present disclosure provides a computer-readable non-transitory storage medium storing computer instructions, wherein a computer executes the method for compensating ultrasonic metering based on a smart gas Internet of Things system when reading the computer instructions.

The embodiments of the present disclosure at least include the following beneficial effects.

(1) by determining the compensation scheme based on the gas transportation feature and the environmental feature, realizing an evaluation of measuring an error caused by an environmental factor, a pipeline factor, and a fluid factor, a more accurate and reliable flow compensation coefficient can be determined, so as to further improve the accuracy of the ultrasonic metering device;

(2) comprehensively considering an influence of a temperature distribution inside and outside the pipeline on the flow rate can further reduce the influence of temperature on measuring data and improve the accuracy of a compensation; determining the flow rate compensation coefficient through a preset algorithm can improve the accuracy of calculating a compensation parameter;

(3) different compensation parameters can be obtained according to a temperature stratification, and different compensation schemes can be implemented for the measuring data according to different temperature changes, so as to reduce the influence of an uneven temperature distribution on the measuring data, and at the same time improve the accuracy of the ultrasonic metering device;

(4) by judging whether target monitoring data is interference data and processing the target monitoring data, the interference data can be eliminated efficiently and accurately, and the influence of the interference data on determining the compensation scheme can be avoided;

(5) the higher the interference confidence level, the more unstable the temperature stratification. When the interference confidence level of the current time point is relatively high, determining temperature stratification data of the current time point based on reference temperature stratification data of a plurality of historical time points before the current time can improve the accuracy of calculating the temperature stratification data, improve the reliability of the temperature stratification data, and facilitate a subsequent judgment on whether the temperature stratification in the pipeline is even.

BRIEF DESCRIPTION OF THE DRAWINGS

The present disclosure will be further illustrated by way of exemplary embodiments, and the exemplary embodiments will be described in detail with the accompanying drawings. These embodiments are non-limiting, and in these embodiments, the same number indicates the same structure, wherein:

FIG. 2 is a flowchart illustrating an exemplary process for compensating ultrasonic metering based on a smart gas Internet of Things system according to some embodiments of the present disclosure;

FIG. 3 is a flowchart illustrating an exemplary process of determining interference data according to some embodiments of the present disclosure;

DETAILED DESCRIPTION

Figure 1:
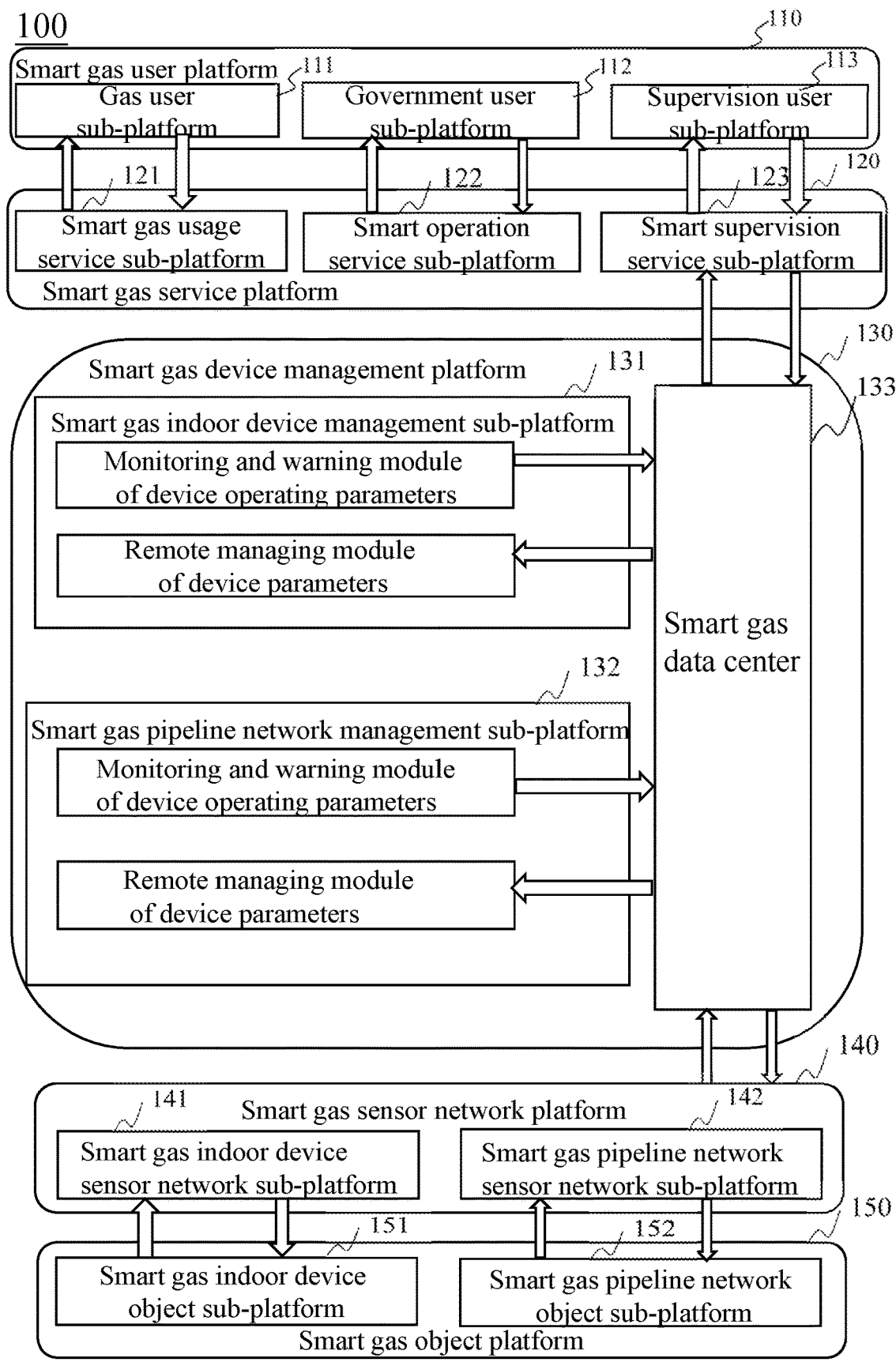
FIG. 1 is a schematic diagram illustrating an exemplary system for compensating ultrasonic metering based on a smart gas Internet of Things system according to some embodiments of the present disclosure.

In order to more clearly illustrate the technical solutions of the embodiments of the present disclosure, the following briefly introduces the drawings that need to be used in the description of the embodiments. Obviously, the accompanying drawings below are only some examples or embodiments of the present disclosure, and those skilled in the art may apply the present disclosure to other similar scenarios according to these accompanying drawings without creative effort. Unless obviously obtained from the context or the context illustrates otherwise, the same numeral in the drawings refers to the same structure or operation.

It should be understood that the terms "system", "device", "unit" and/or "module" used herein are a method for distinguishing different components, elements, parts, parts, or assemblies of different levels. However, the words may be replaced by other expressions if other words can achieve the same purpose.

As indicated in the present disclosure and claims, the terms "a", "an", "an" and/or "the" are not specific to the singular and may include the plural unless the context clearly indicates an exception. Generally speaking, the terms "comprise", "comprises", "comprising" and "include", "includes", "including" only suggest the inclusion of clearly identified steps and elements, and these steps and elements do not constitute an exclusive list, and the method or device may also contain other steps or elements.

The flowchart is used in the present disclosure to illustrate the operations performed by the system according to the embodiments of the present disclosure. It should be understood that the preceding or following operations are not necessarily performed in order exactly. Instead, various steps may be processed in reverse order or simultaneously. At the same time, other operations can be added to these procedures, or a certain step or steps can be removed from these procedures.

FIG. 1 is a schematic diagram illustrating an exemplary system for compensating ultrasonic metering based on a smart gas Internet of Things system according to some embodiments of the present disclosure; the system for compensating ultrasonic metering based on a smart gas Internet of Things system involved in the embodiments of the present disclosure will be described in detail below. It should be noted that the following examples are only used to explain the present disclosure, and do not constitute a limitation to the present disclosure.

In some embodiments, a system 100 for compensating ultrasonic metering based on a smart gas Internet of Things system (hereinafter referred to as a system 100 for compensating ultrasonic metering) may include a smart gas user platform 110, a smart gas service platform 120, a smart gas device management platform 130, a smart gas sensor network platform 140, and a smart gas object platform 150.

The smart gas user platform 110 may be a platform for interacting with a user. In some embodiments, the smart gas user platform 110 may be configured as a terminal device.

In some embodiments, the smart gas user platform 110 may include a gas user sub-platform 111, a government user sub-platform 112, and a supervision user sub-platform 113.

The gas user sub-platform 111 may be a platform that provides a gas user with data related to gas usage and a solution to a gas problem. The gas user may be an industrial gas user, a commercial gas user, an ordinary gas user, etc.

The government user sub-platform 112 may be a platform that provides gas operation-related data for a government user. The government user may be a manager of a gas operation entity (e.g., a manager of an administrative department), etc.

The supervision user sub-platform 113 may be a platform for a supervision user to supervise an operation of an entire Internet of Things system. The supervision user may be personnel of a safety management department.

The smart gas service platform 120 may be a platform for communicating the user's need and control information. The smart gas service platform 120 may obtain management information of a gas device from the smart gas device management platform 130 and upload the management information to the smart gas user platform 110.

In some embodiments, the smart gas service platform 120 may include a smart gas usage service sub-platform 121, a smart operation service sub-platform 122, and a smart supervision service sub-platform 123.

The smart gas usage service sub-platform 121 may be a platform that provides a gas service for the gas user.

The smart operation service sub-platform 122 may be a platform that provides information related to the gas operation (e.g., the management information of the gas device) for the government user.

The smart supervision service sub-platform 123 may be a platform that satisfies a supervision need of the supervision user.

The smart gas device management platform 130 may be a platform that integrates and coordinates a connection and collaboration between various functional platforms, gathers all information of the Internet of Things system, and provides functions of perception management and control management for an operation system of the Internet of Things system.

In some embodiments, the smart gas device management platform 130 may be divided into a smart gas indoor device management sub-platform 131, a smart gas pipeline network management sub-platform 132, and a smart gas data center 133.

The smart gas indoor device management sub-platform 131 may be a platform for processing information related to an indoor device. In some embodiments, the smart gas indoor device management sub-platform 131 may include but not limited to a monitoring and warning module of device operating parameters and a remote managing module of device parameters.

The smart gas pipeline network management sub-platform 132 may be a platform for monitoring and managing a gas pipeline network. In some embodiments, the smart gas pipeline network management sub-platform 132 may include but not limited to a monitoring and warning module of device operating parameters and a remote managing module of device parameters.

The smart gas indoor device management sub-platform 131 and the smart gas pipeline network management sub-platform 132 may respectively analyze and process relevant information of the indoor device or the pipeline network through the modules, and remotely set, adjust, and authorize operation parameters of the indoor device or the pipeline network in the managing module of device parameters in case that abnormal operation parameters occur in the indoor device or the pipeline network.

The smart gas data center 133 may be configured to store and manage all operation information of the system 100 for compensating ultrasonic metering. In some embodiments, the smart gas data center 133 may be configured as a storage device for storing data related to the gas device or the like. For example, a gas pipeline feature.

In some embodiments, the smart gas device management platform 130 may exchange information with the smart gas service platform 120 and the smart gas sensor network platform 140 respectively through the smart gas data center 133.

The smart gas sensor network platform 140 may be a platform for managing sensor communication. In some embodiments, the smart gas sensor network platform 140 may realize functions of sensor communication of perception information and sensor communication of control information.

In some embodiments, the smart gas sensor network platform 140 may include a smart gas indoor device sensor network sub-platform 141 and a smart gas pipeline network sensor network sub-platform 142, which may be configured to obtain operation information of the gas indoor device and the gas pipeline network respectively.

The smart gas object platform 150 may be a platform for generating the perception information and executing the control information. For example, the smart gas object platform 150 may monitor and obtain the operation information of the gas indoor device and the gas pipeline network.

In some embodiments, the smart gas object platform 150 may include a smart gas indoor device object sub-platform 151 and a smart gas pipeline network object sub-platform 152.

In some embodiments, the smart gas indoor device object sub-platform 151 may be configured as various types of gas indoor devices for the gas user.

In some embodiments, the smart gas pipeline network object sub-platform 152 may be configured as various types of gas pipeline networks and monitoring devices.

In some embodiments of the present disclosure, the system 100 for compensating ultrasonic metering can form a closed loop of information operation between the smart gas object platform and the smart gas user platform, and can coordinate and operate regularly under unified management of the smart gas management platform, so as to realize the informatization and intellectualization of managing the gas device.

It should be noted that the above description of the system 100 for compensating ultrasonic metering based on a smart gas Internet of Things system and units of the system is only for the convenience of description, and dose not limit the present disclosure to the scope of the embodiments.

FIG. 2 is a flowchart illustrating an exemplary process of compensating ultrasonic metering based on a smart gas Internet of Things system according to some embodiments of the present disclosure.

In some embodiments, a process 200 may be implemented by the system 100 for compensating ultrasonic metering and may be executed by a smart gas device management platform. As shown in FIG. 2, the process 200 includes the following steps.

step 210: determining a first preset condition based on a gas pipeline feature obtained from an external database.

The gas pipeline feature may include a parameter feature such as material, inner diameter, and outer diameter of a pipeline.

The external database refers to a database outside the system 100 for compensating ultrasonic metering, and the external database stores the gas pipeline feature obtained from a pipeline manufacturer, an actual measurement, or other channels.

The first preset condition refers to a judging condition for evaluating whether a flow compensation is required. In some embodiments, the first preset condition may be a condition related to a gas transportation feature and an environmental feature. For example, the preset condition may include a numerical value or a numerical range corresponding to the at least one of gas transportation feature or environmental feature.

The gas transportation feature may include a gas flow rate, a gas temperature, a gas pressure, and other parameter features. The gas flow rate refers to an original flow rate of gas in a pipeline.

The environmental feature may include a parameter feature such as an environmental temperature, an environmental pressure, an environmental humidity, light data, and weather data of an environment where the pipeline is located. In some embodiments, the environmental feature may also include a light intensity.

In some embodiments, the first preset condition includes that the gas flow rate is greater than a flow rate threshold, and a difference between the gas temperature and the environmental temperature is smaller than a temperature difference threshold.

In some embodiments, the flow rate threshold may be determined based on the gas pipeline feature. In some embodiments, the smart gas device management platform may determine the flow rate threshold according to a preset correspondence between different gas pipeline features and different flow rate thresholds as well as a gas pipeline feature currently obtained.

In some embodiments, the different flow rate thresholds may correspond to different temperature difference thresholds, and the greater the flow rate threshold, the greater the corresponding temperature difference threshold. In some embodiments, the smart gas device management platform may determine the temperature difference threshold according to a corresponding relationship between preset different flow rate thresholds and the different temperature difference thresholds as well as a flow rate threshold currently determined.

step 220, obtaining the gas transportation feature and the environmental feature based on at least one sensor.

In some embodiments, the at least one sensor may include but not limited to, a flow rate sensor, a temperature sensor, an air pressure sensor, a humidity sensor, a pyranometer, or the like.

The gas transportation feature and the environmental feature may be obtained according to at least one sensor installed in or outside the pipeline respectively.

step 230: determining a compensation scheme based on the gas transportation feature, the environmental feature, and the first preset condition.

The compensation scheme refers to a manner of compensating for flow metering data. The compensation scheme may be configured to compensate the at least one of gas flow rate, gas flow rate, gas temperature, or the like.

In some embodiments, the compensation scheme includes at least one of a flow rate compensation coefficient, a flow compensation parameter, a temperature compensation coefficient, a pressure compensation coefficient, or the like.

The flow rate compensation coefficient is parameter data configured to compensate the gas flow rate.

The flow compensation parameter is parameter data configured to compensate a gas flow. In some embodiments, the flow compensation parameter includes a first flow compensation parameter and a second flow compensation parameter. More content about the first flow compensation parameter and the second flow compensation parameter can be found in the following.

The temperature compensation coefficient and the pressure compensation coefficient are parameter data configured to compensate the gas temperature and the gas pressure respectively.

In some embodiments, the smart gas device management platform may determine the compensation scheme in various ways based on the gas transportation feature, the environmental feature, and the first preset condition. For example, judging whether the gas transportation feature and the environmental feature satisfy the first preset condition, and according to a judgment result, the compensation scheme is determined as a combination of at least one or more of the flow rate compensation coefficient, the first flow compensation parameter, the second flow compensation parameter, the temperature compensation coefficient, and the pressure compensation coefficient.

In some embodiments, when the gas transportation feature and environmental feature satisfy the first preset condition, that is, the gas flow rate is more than the flow rate threshold, and the difference between the gas temperature and the environmental temperature is smaller than the temperature difference threshold, the smart gas device management platform may determine the compensation scheme to be compensated by utilizing the flow rate compensation coefficient only.

In some embodiments, the smart gas device management platform may determine the flow rate compensation coefficient through a vector database. The vector database includes a plurality of first reference feature vectors and reference flow rate compensation parameters corresponding to the plurality of first reference feature vectors. The first reference feature vector may be constructed based on a historical gas flow rate, a historical environmental temperature, and a historical gas temperature, and the reference flow rate compensation parameter may be determined based on a historical compensation scheme.

In some embodiments, the smart gas device management platform may construct a first feature vector based on the gas flow rate, the environmental temperature, and the gas temperature; search in the vector database based on the first feature vector; determine a first reference feature vector that satisfies a preset matching condition as a first associated feature vector; and determine a reference flow rate compensation parameter corresponding to the first associated feature vector as a current flow rate compensation parameter. The preset condition refers to a judgment condition configured to determine the first associated feature vector. In some embodiments, the preset condition may include that a vector distance is smaller than a distance threshold, the vector distance is the smallest or the like.

In some embodiments, the smart gas device management platform may calculate the flow rate compensation coefficient according to a preset algorithm based on the gas flow rate, the environmental temperature, and the gas temperature.

The preset algorithm may include but not limited to, a database query algorithm, a fitting algorithm, or the like.

In some embodiments, the preset algorithm includes obtaining original flow rate data corresponding to each temperature combination through a measurement of an ultrasonic metering device; obtaining actual flow rate data corresponding to the each temperature combination; obtaining a flow rate compensation formula by fitting the actual flow rate data, predicted flow rate data, the environmental temperature, and the gas temperature; determining the flow rate compensation coefficient through the flow rate compensation formula. The temperature combination refers to a combination of the environmental temperature and the gas temperature.

The ultrasonic metering device is a device configured to measure a flow of media in the pipeline. For example, the ultrasonic metering device may be a Doppler ultrasonic flow meter, a transit-time ultrasonic flow meter, an ultrasonic gas meter, or the like.

The original flow rate data refers to an uncompensated gas flow rate in the pipeline measured by the ultrasonic metering device.

The actual flow rate data refers to an actual gas flow rate in the pipeline measured in an experiment.

In some embodiments, the smart gas device management platform may process actual flow rate data, predicted flow rate data, environmental temperature, and gas temperature corresponding to each temperature through a fitting algorithm to determine the flow rate compensation formula. The fitting algorithm may include a least square method, a Levenberg-Marquardt algorithm, a genetic algorithm, Hough transform, or the like.

In some embodiments, the smart gas device management platform may input the actual flow rate data, the original flow rate data, the environmental temperature, and the gas temperature corresponding to the each temperature combination into a simulation software for simulation, and output a simulation result which may reflect flow rate compensation of the each temperature combination in a pipeline transmission process in a form of the flow rate compensation formula.

In some embodiments of the present disclosure, by comprehensively considering an influence of a temperature distribution inside and outside the pipeline on the flow rate, influence of temperature on measuring data can be further reduced, and the accuracy of compensation can be improved; the accuracy of calculating compensation parameters can be improved by determining the flow rate compensation coefficient through the preset algorithm.

In some embodiments, when the gas transportation feature and the environmental feature do not satisfy the first preset condition, the smart gas device management platform may determine the compensation scheme based on the following steps S1 to S2 (described in paragraph 0087 through paragraph 0112, not shown in figures).

step S1, determining temperature stratification data.

The temperature stratification data may reflect a temperature stratification of a pipeline profile. The temperature stratification refers to a phenomenon in which a fluid temperature is distributed in a circular pattern within a pipeline.

In some embodiments, the temperature stratification data may be represented in a plurality of ways. For example, the temperature stratification data may be a radial temperature distribution map of the pipeline profile. As another example, the temperature stratification data may be expressed by a vector [(T1, A1), (T2, A1), . . . ], wherein the T1 and the T2 represent a temperature, and the A1 and the A2 represent a region where a temperature is the T1 and the T2 respectively. The region may be an area formed by points with a same or similar temperature (e.g., within ±1°) in the pipeline profile. For example, the region may be a circular region, an annular region, or the like in the pipeline profile.

In some embodiments, the smart gas device management platform may determine temperature stratification data at a current time point by analyzing and processing the gas pipeline feature, the gas transportation feature, and the environmental feature at the current time point. An exemplary manner of processing may include fitting or the like.

In some embodiments, the smart gas device management platform may determine the temperature stratification data based on a temperature stratification prediction model. More description about the temperature stratification prediction model can be found in FIG. 5.

In some embodiments, the temperature stratification data may include whether the temperature stratification is even. An even temperature stratification refers to a same or similar temperature at various points in the pipeline profile.

In some embodiments, whether the temperature stratification is even may be determined based on light data. For example, when a light intensity is less than the first light intensity threshold, this may be considered that the temperature stratification is even. When the light intensity is greater than a second light intensity threshold, this may be considered that the temperature stratification is not even. The first light intensity threshold is smaller than the second light intensity threshold, both of which may be obtained by the system or an artificial preset.

step S2, determining the compensation scheme based on the temperature stratification data and a second preset condition.

The second preset condition refers to a judgment condition configured to determine content included in the compensation scheme. In some embodiments, the second preset condition may include that the temperature stratification data is an even temperature stratification or the like.

Different compensation schemes may be determined according to different relationships between the temperature stratification data and the second preset condition. In the following paragraphs from 0097 to 0112 (but not shown in figures), step S21 to step S22 will be used to determine the compensation scheme for exemplary description, and the order of description between step S21 to step S22 is not limiting.

step S21, in response to the temperature stratification data satisfying the second preset condition, determining the compensation scheme as a combination of the first flow compensation parameter and the flow rate compensation coefficient.

The first flow compensation parameter refers to data for compensating for a gas flow without considering the temperature stratification.

The smart gas device management platform may determine the first flow compensation parameter in various ways. In some embodiments, the smart gas device management platform may match a similar reference gas transportation feature and a similar reference environmental feature in a preset comparison table based on the gas transportation feature and environmental feature at the current time point, and determine a reference first flow compensation parameter corresponding to the reference gas transportation feature and the reference environmental feature as a gas transportation feature0 determined currently. The preset comparison table includes a corresponding relationship between a plurality of reference gas transportation features and a plurality of reference environmental features with a plurality of reference first flow compensation parameters, the corresponding relationship may be determined according to prior knowledge or historical data.

In some embodiments, the smart gas device management platform may process the gas transportation feature and the environmental feature through a first parameter determination model to determine the first flow compensation parameter, and the first parameter determination model is a machine learning model.

In some embodiments, the first parameter determination model may be a neural network model or the like.

In some embodiments, the first parameter determination model may be obtained by training a large number of first training samples with a first label. In some embodiments, the first training sample may include a sample gas transportation feature and a sample environmental feature, and the first training sample may be obtained through historical data. In some embodiments, the first label is a historical first flow compensation parameter corresponding to the first training sample, and the first label may be determined by a processor or manually marked.

In some embodiments of the present disclosure, using the first parameter determination model to determine the first flow compensation parameter can improve self-learning capability of the machine learning model, so as to improve the accuracy and efficiency of determining the first flow compensation parameter.

In some embodiments, in response to the temperature stratification data satisfying the second preset condition, the smart gas device management platform may further determine the compensation scheme as one that uses the temperature compensation coefficient for temperature compensation.

The smart gas device management platform may determine the temperature compensation coefficient in various ways. In some embodiments, the smart gas device management platform may obtain the temperature compensation coefficient by segment fitting through a propagation speed and a fluid kinematic viscosity of an ultrasonic wave in the fluid at several temperature points;

In some embodiments, in response to the temperature stratification data satisfying the second preset condition, the smart gas device management platform may further determine whether the gas temperature is within a standard gas temperature range, and when the gas temperature is within the standard gas temperature range, the smart gas device management platform may further determine the compensation scheme as one that uses the pressure compensation coefficient for pressure compensation. The standard gas temperature range may be determined by the system or manually based on prior knowledge or historical data.

The smart gas device management platform may determine the pressure compensation coefficient in various ways. In some embodiments, the smart gas device management platform may obtain the temperature compensation coefficient by segment fitting based on a propagation speed and a fluid kinematic viscosity of the ultrasonic wave in the fluid in different pressure environments; gas temperatures in different pressure environments are all within the standard gas temperature range.

step S22, in response to the temperature stratification data not satisfying the second preset condition, determining the compensation scheme as a combination of the second flow compensation parameter and the flow rate compensation coefficient.

The second flow compensation parameter refers to data for compensating for the gas flow considering the temperature stratification.

In some embodiments, the smart gas device management platform may filter historical transmission data of the pipeline under the same or similar temperature stratification data, and determine the second flow compensation parameter based on the historical transmission data. For example, the smart gas device management platform may select a historical gas transportation feature and a historical environmental feature that are the same as or similar to the current gas transportation feature and the current environmental feature from the historical transmission data, and determine a second flow compensation parameter corresponding to the historical gas transportation feature and the historical environmental feature as the second flow compensation parameter currently.

In some embodiments, the smart gas device management platform may also determine the second flow compensation parameter in other ways. More details can be found in FIG. 5 and related descriptions thereof.

In some embodiments of the present disclosure, different compensation parameters are obtained according to the temperature stratification, and different compensation schemes are implemented for the measuring data according to different temperature changes, so as to reduce an influence of the uneven temperature distribution on the measuring data, and improve the accuracy of the ultrasonic metering device at the same time.

step 240, sending the compensation scheme to the ultrasonic metering device to control the ultrasonic metering device to determine updated flow metering data according to the compensation scheme.

The updated flow metering data refers to data obtained after compensating for a measuring value of the ultrasonic metering device based on the compensation scheme.

In some embodiments, the ultrasonic metering device may perform various compensation operations on the measuring value based on the compensation scheme to obtain the updated flow metering data. For example, the ultrasonic metering device may scale up or down a measured flow rate based on the compensation scheme.

In some embodiments, when the gas flow rate is greater than the flow rate threshold and the difference between the gas temperature and the environmental temperature is less than the temperature difference threshold, the ultrasonic metering device can update the flow metering data based on the flow rate compensation coefficient. When the gas flow rate is less than the flow rate threshold or the difference between the gas temperature and the environmental temperature is greater than the temperature difference threshold, and the temperature stratification data satisfies the second preset condition, the ultrasonic metering device can update the flow metering data based on the flow rate compensation coefficient and the first flow compensation coefficient. When the gas flow rate is less than the flow rate threshold or the difference between the gas temperature and the environmental temperature is greater than the temperature difference threshold, and the temperature stratification data does not satisfy the second preset condition, the ultrasonic metering device can update the flow metering data based on the flow rate compensation coefficient and the second flow compensation coefficient.

In some embodiments of the present disclosure, determining the compensation scheme based on the gas transportation feature and the environmental feature can evaluate measuring errors caused by an environmental factor, a pipeline factor, and a fluid factor, so as to determine a more accurate and reliable flow compensation coefficient, and further improve the accuracy of the ultrasonic metering device.

FIG. 3 is a flowchart illustrating an exemplary process of determining interference data according to some embodiments of the present disclosure. In some embodiments, a process 300 may be executed by a smart gas device management platform. As shown in FIG. 3, the process 300 includes the following steps.

step 310, obtaining target monitoring data at a target time point, a first monitoring data sequence within a first preset time period, and a second monitoring data sequence within a second preset time period.

The target time point refers to a time point at which a judgment of the interference data is performed. The target time point is a historical time point.

The monitoring data may be data related to an internal and external factor of a gas pipeline.

In some embodiments, the monitoring data includes at least one of a gas transportation feature or an environmental feature. More descriptions of the gas transportation feature and the environmental feature can be found in FIG. 2.

The target monitoring data may be monitoring data obtained at the target time point.

In some embodiments, the first preset time period may be a period of time before the target time point. A preset length of the first preset time period may be determined in various ways. For example, the preset length may be preset by the system or manually. As another example, the preset length may be determined through a preset rule or through a vector database according to a time distribution (morning, noon, or midnight is related to a range of light changes and a range of environmental temperature changes), weather data, etc.

The first monitoring data sequence is a data sequence composed of monitoring data at a plurality of historical time points within the first preset time period.

In some embodiments, the second preset time period may be a period of time after the target time point. A preset length of the second preset time period may be determined in various ways, and a manner to determine the preset length of the second preset time period is similar to that of the first preset time period, which will not be repeated herein.

The second monitoring data sequence is a data sequence composed of monitoring data at a plurality of historical time points within the second preset time period.

Current monitoring data, the first monitoring data sequence, and the second monitoring data sequence may be obtained through a user's input, reading from a memory, etc., or may be obtained by any manner known to those skilled in the art, which is not limited herein.

step 320, judging whether the target monitoring data being the interference data based on the first monitoring data sequence and the second monitoring data sequence.

The interference data may be data that is numerically abnormal. For example, monitoring data with data mutations.

In some embodiments, the smart gas device management platform may analyze and process the first monitoring data sequence and the second monitoring data sequence in various ways to judge whether the target monitoring data is the interference data.

In some embodiments, the smart gas device management platform may use an outlier monitoring algorithm to analyze and process the first monitoring data sequence and the second monitoring data sequence to judge whether the target monitoring data is the interference data. Exemplary outlier detection algorithms may include but are not limited to, a K-nearest neighbor (KNN), One-Class SVM, or the like.

In some embodiments, the smart gas device management platform may analyze and process based on the first monitoring data sequence and the second monitoring data sequence to judge whether there is the interference data in the first monitoring data sequence and the second monitoring data sequence. A judging manner is similar to judging whether the target monitoring data is the interference data, which will not be repeated herein.

In some embodiments, the smart gas device management platform may determine whether the target monitoring data is the interference data through an interference data determination model. More content about the interference data determination model can be found in FIG. 5.

step 330, processing the interference data in response to the target monitoring data being the interference data.

There are many ways to process the interference data.

In some embodiments, a processing manner may include discarding the interference data directly and re-acquiring data, or selecting monitoring data closest to the target time point from the second monitoring data sequence (eliminating the interference data therein) as the target monitoring data, or taking a mean value of the second monitoring data sequence (eliminating the interference data therein) as the target monitoring data.

In some embodiments, the interference data may be processed in other ways, which is not limited herein.

In some embodiments of the present disclosure, by judging whether the target monitoring data is the interference data and processing the interference data, the interference data can be eliminated efficiently and accurately, and an influence of the interference data on determining the compensation scheme can be avoided.

Figure 4:
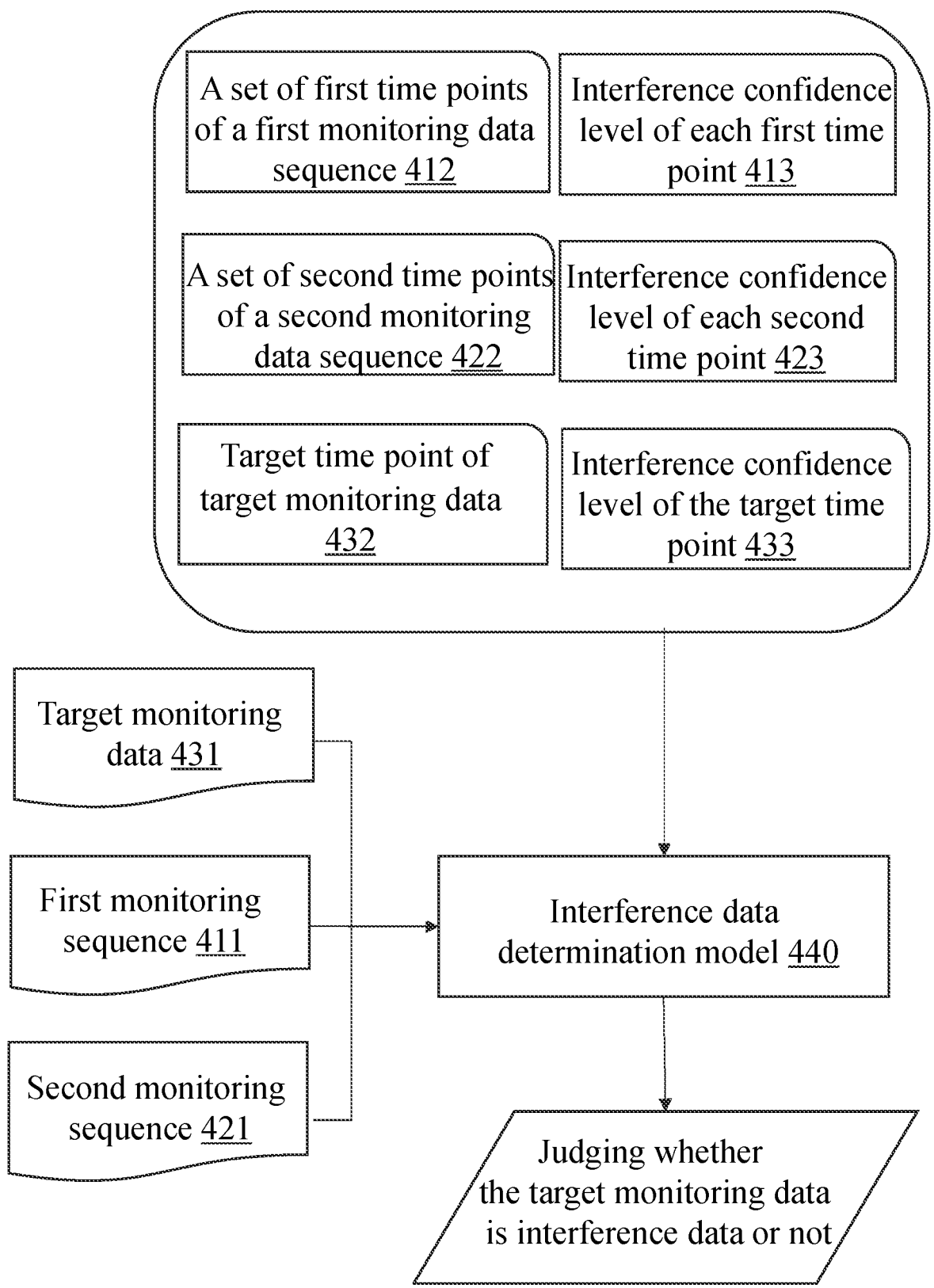
FIG. 4 is a schematic diagram illustrating an exemplary judgment of the interference data based on an interference data determination model according to some embodiments of the present disclosure.

FIG. 4 is a schematic diagram illustrating an exemplary judgment of the interference data based on an interference data determination model according to some embodiments of the present disclosure;

In some embodiments, the smart gas device management platform 130 may judge whether target monitoring data 431 is interference data through an interference data determination model 440 based on a first monitoring data sequence 411, a second monitoring data sequence 421, and the target monitoring data 431, and the interference data determination model 440 is a machine learning model.

In some embodiments, the interference data determination model may be a neural network model or the like.

In some embodiments, an input of the interference data determination model 440 may include the first monitoring data sequence 411, the second monitoring data sequence 421, and the target monitoring data 431, and an output is a judgment result of whether the target monitoring data 431 is the interference data. More descriptions of the first monitoring data sequence, the second monitoring data sequence, and the target monitoring data can be found in FIG. 3.

In some embodiments, the input of the interference data determination model 440 may also include a set of first time points of the first monitoring data sequence 412 and an interference confidence level 413 of each first time point, a set of second time points of the second monitoring data sequence 422 and an interference confidence level 423 of each second time point, a target time point 432 of the target monitoring data and an interference confidence level of the target monitoring data 433.

The first time point is a time point at which monitoring data is acquired within a first preset time period. The set of first time points refers to a set of a plurality of first time points within the first preset time period.

The second time point is a time point at which the monitoring data is acquired within a second preset time period. The set of second time points refers to a set of a plurality of second time points within a second preset time period. More descriptions of the first preset time period and the second preset time period can be found in FIG. 3.

The target time point refers to a time point when the target monitoring data is acquired. The target time point is a historical time point.

The interference confidence level may be a value measuring the accuracy of the judgment result of the interference data. The higher the interference confidence level, the higher the accuracy of the judgment result. The interference confidence level may be in a form of a numerical value, percentage, fraction, etc. See below for more explanation on how to determine the interference confidence level.

The interference data determination model 440 may be obtained by training a large number of second training samples with a second label. In some embodiments, the second training sample may be a sample first monitoring data sequence, a sample second monitoring data sequence, or a sample target monitoring data. In some embodiments, the second training sample may also include a set of first time points of the sample first monitoring data sequence and an interference confidence level of each first time point, a set of second time points of the sample second monitoring data sequence and an interference confidence level of each second time point, a target time point of the sample target monitoring data, and an interference confidence level of the target time point. The second training sample may be obtained based on historical monitoring data.

In some embodiments, the second label may be whether the sample target monitoring data is the interference data. For example, when the sample target monitoring data is the interference data, the second label is 1, otherwise it is 0. The second label may be obtained by manual labeling.

In some embodiments of the present disclosure, by making the input of the interference data determination model include each time point and an interference confidence level corresponding to the each time point, the accuracy of judging the interference data can be further improved.

In some embodiments of the present disclosure, the interference data is determined by the interference data determination model, which can improve the accuracy of determining the interference data, and can effectively monitor the abnormality of the monitoring data, which is conducive to timely processing the interference data, as well as to subsequently obtaining more accurate compensation parameters based on processed data.

In some embodiments, the smart gas device management platform may determine the interference confidence level based on a ratio of a count of occurrences of the interference data at a certain acquiring point to a total count of all data at the acquiring point in historical pipeline transmission data.

In some embodiments, the smart gas device management platform may respectively select a first count of monitoring data at different time points from the first monitoring data sequence, the second monitoring data sequence, and the target monitoring data as reference data, and determine a second count of monitoring data as data to be evaluated; determine an interference confidence level of acquiring time points corresponding to the data to be evaluated through the confidence level determination model.

The first count refers to a count of data selected from a set of monitoring data as benchmark data. The set of monitoring data is a combination of monitoring data at a plurality of time points formed by the first monitoring data sequence, the second monitoring data sequence, and the target monitoring data. The first count may be obtained by the system or manual presetting. The selection may be a random selection or a selection based on a preset selection rule, which is not limited herein.

The benchmark data may be sample data used to evaluate whether certain monitoring data is the interference data. The second count refers to a remaining count of data to be evaluated in addition to the benchmark data in the set of monitoring data. The data to be evaluated refers to data that needs to be determined whether it is the interference data.

As an example only, if there are ten items of data in the first monitoring data sequence and ten items of data in the second monitoring data sequence, and current monitoring data is one item of data at a time point, then ten items of monitoring data are randomly selected from twenty-one items of monitoring data as the benchmark data, and the remaining eleven items of monitoring data are as the data to be evaluated.

In some embodiments, the smart gas device management platform may obtain the interference confidence level of the each acquiring time point corresponding to the first monitoring data sequence, the second monitoring data sequence, and current detection data by applying the confidence level determination model at least twice. For example, taking the above example as an example, the ten items of monitoring data are used as the benchmark data, and the eleven items of monitoring data are the data to be evaluated, then an interference confidence level of the eleven items of data to be evaluated may be determined when the confidence level determination model is applied for the first time. Then when applying the confidence level determination model for the second time, the eleven items of monitoring data may be used as the benchmark data, and the ten items of monitoring data may be used as the data to be evaluated to determine an interference confidence level of the ten items of data to be evaluated.

The confidence level determination model is a machine learning model. In some embodiments, the confidence level determination model may be a neural network model or the like.

In some embodiments, an input of the confidence level determination model may include the benchmark data and acquiring time points corresponding to the benchmark data, the data to be evaluated and acquiring time points corresponding to the data to be evaluated, and an output may include the interference confidence level of the acquiring time points corresponding to the data to be evaluated.

In some embodiments, the confidence level determination model may be obtained by training a large number of third training samples with a third label. In some embodiments, the third training sample may include sample benchmark data and acquiring time points corresponding to the sample benchmark data, sample data to be evaluated and acquiring time points corresponding to the sample data to be evaluated, which may be obtained through historical data. In some embodiments, the third label is an actual interference confidence level of the acquiring time points corresponding to the sample data to be evaluated. The third label may be determined by a processor or human labeling. For example, determining whether the sample data to be evaluated is the interference data, and if the sample data to be evaluated is the interference data, the third label may be marked as 1, otherwise, it may be marked as 0.

In some embodiments of the present disclosure, determining the interference confidence level through the confidence level determination model can obtain better results than directly determining the interference confidence level based on an empirical presetting, and improves the reliability of determining the interference data and saves human and time costs subsequently.

Figure 5:
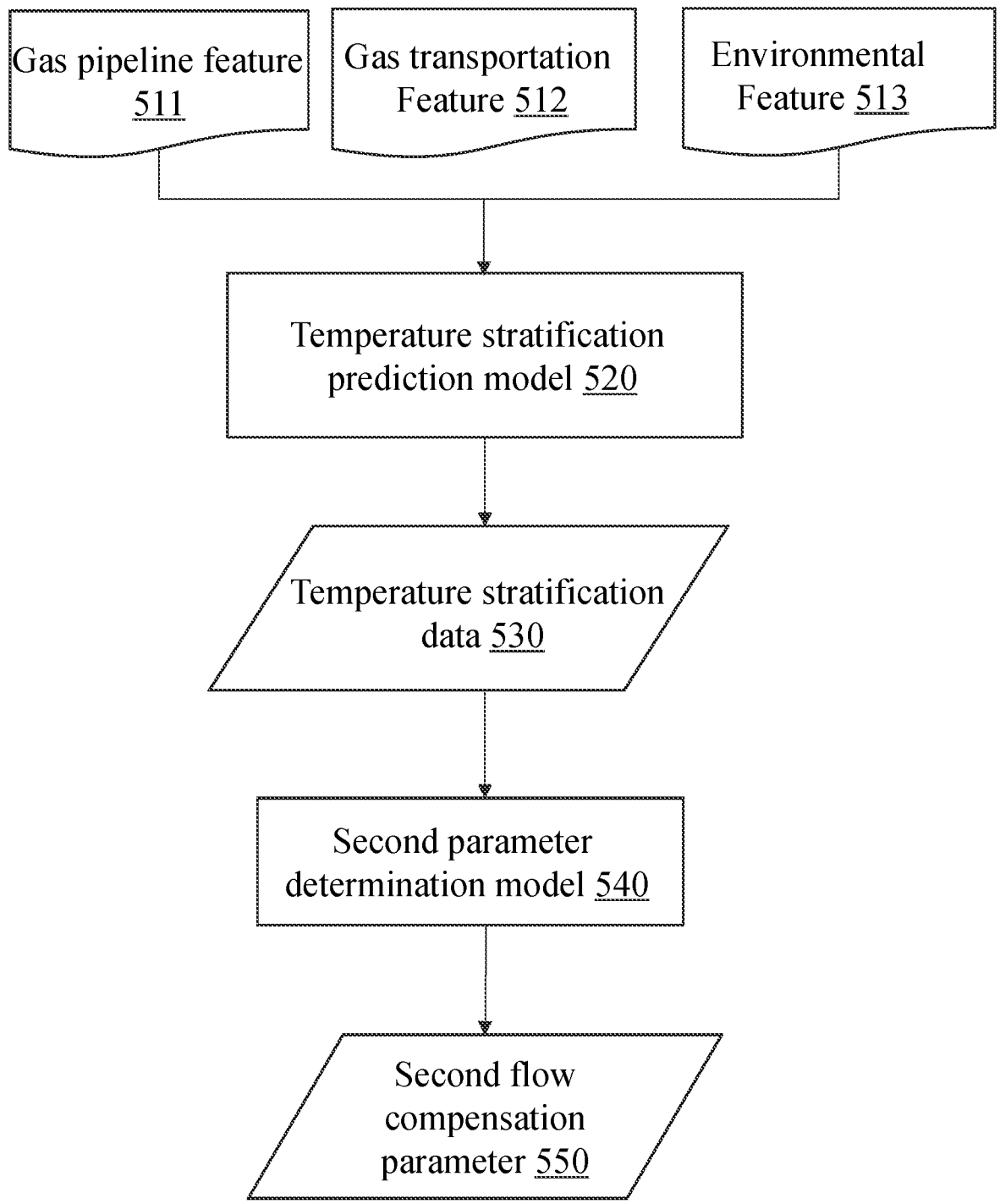
FIG. 5 is a schematic diagram illustrating an exemplary temperature stratification prediction model and an exemplary second parameter determination model according to some embodiments of the present disclosure.

FIG. 5 is a schematic diagram illustrating an exemplary temperature stratification prediction model and an exemplary second parameter determination model according to some embodiments of the present disclosure.

In some embodiments, the smart gas device management platform 130 may determine temperature stratification data through the temperature stratification prediction model based on a gas pipeline feature, a gas transportation feature, and an environmental feature; in response to the gas transportation feature and the environmental feature satisfying a third preset condition, a second flow compensation parameter is determined based on the temperature stratification data.

The temperature stratification prediction model is a machine learning model. For example, the temperature stratification prediction model may be a convolutional neural network model or the like.

As shown in FIG. 5, in some embodiments, an input of a temperature stratification prediction model 520 may include a gas pipeline feature 511, a gas transportation feature 512, and an environmental feature 513 at a current time point, and an output may include temperature stratification data 530.

In some embodiments, in response to an interference confidence level of the current time point being higher than a preset threshold, the input of the temperature stratification prediction model 520 further includes a gas pipeline feature, a gas transportation feature, and an environmental feature at at least one historical time point. A plurality of reference temperature stratification data may be determined by inputting a plurality of gas pipeline features, a plurality of gas transportation features, and a plurality of environmental features acquired at a plurality of historical time points before the current time point into the temperature stratification prediction model. The interference confidence level of the current time point may be obtained based on a confidence level determination model. For example, monitoring data at the current time point may be used as data to be evaluated, and monitoring data at other time points may be used as benchmark data to obtain the interference confidence level of the current time point. More descriptions of the confidence level determination model can be found in FIG. 4 and related descriptions thereof.

It should be noted that the higher the interference confidence level of the current time point is, temperature stratification in a pipeline is more unstable, and the temperature stratification data needs to be adjusted. For example, if the interference confidence level of the current time point is greater than a confidence threshold, the temperature stratification data may be adjusted, and temperature stratification data after an adjustment is determined as final temperature stratification data; if the interference confidence level of the current time point is less than the confidence threshold, the temperature stratification data may not be adjusted.

In some embodiments, adjusting the temperature stratification data may include: clustering based on the plurality of reference temperature stratification data to obtain a plurality of clustering center sets, and determining a clustering center of a clustering center set that contains most reference temperature stratification data as temperature stratification data of the current time point after the adjustment. Clustering algorithms may include but are not limited to K-Means clustering and/or density-based clustering methods (DBSCAN), etc.

In some embodiments of the present disclosure, the higher the interference confidence level, the more unstable the temperature stratification, and when the interference confidence level of the current time point is relatively high, the temperature stratification data of the current time point may be determined by the reference temperature stratification data of the plurality of historical time points before the current time point. This manner of determination can effectively improve the accuracy of calculating the temperature stratification data, improve the reliability of the temperature stratification data, and facilitate subsequent judgments on whether the temperature stratification in a pipeline is even.

In some embodiments, the temperature stratification prediction model 520 may be obtained by training a large number of fourth training samples with a fourth label.

In some embodiments, the fourth training sample may include a sample gas pipeline feature, a sample gas transportation feature, and a sample environmental feature, and the fourth training sample may be obtained through historical data. In some embodiments, the fourth label is historical temperature stratification data corresponding to the fourth training sample, and the fourth label may be determined by a processor or manually marked.

In some embodiments, the temperature stratification prediction model 520 may be obtained through a joint training with a second parameter determination model 540. More details can be found in related descriptions below.

The third preset condition refers to a condition for judging whether it is necessary to determine the second flow compensation parameter.

In some embodiments, the third preset condition may include: the gas transportation feature and the environmental feature do not satisfy a second preset condition, and a light intensity is greater than a light intensity threshold.

The light intensity threshold refers to a threshold condition related to the light intensity.

In some embodiments, the light intensity threshold is preset by the system or by humans. In some embodiments, the light intensity threshold is related to the interference confidence level. For example, the light intensity threshold may be negatively related to the interference confidence level.

A larger change in the environmental feature or the gas transportation feature may lead to a larger change in a certain set of monitoring data, so an interference confidence level of the monitoring data of the set is relatively great, indicating that the temperature stratification in the pipeline tends to be more uneven. By setting the light intensity threshold to be negatively related to the interference confidence level, a smaller light intensity threshold may be set when the interference confidence level is relatively great, so as to improve the sensitivity of detecting the light intensity.

In some embodiments, the smart gas device management platform may determine the second flow compensation parameter when the gas transportation feature and the environmental feature are judged to not satisfy the second preset condition, and the light intensity is greater than the light intensity threshold.

In some embodiments of the present disclosure, considering an influence of the temperature stratification data and the light intensity on the temperature stratification, a problem of inaccurate measurement caused by uneven temperature stratification can be effectively avoided, thereby improving the accuracy of measuring a flow in the gas pipeline.

In some embodiments, the smart gas device management platform may determine the second flow compensation parameter based on the temperature stratification data in various ways. For example, the smart gas device management platform may preset a corresponding relationship between the temperature stratification data and the second flow compensation parameter, and obtain the second flow compensation parameter by querying a table.

As shown in FIG. 5, in some embodiments, the smart gas device management platform may determine the second flow compensation parameter through the second parameter determination model 540 based on the temperature stratification data 530. The second parameter determination model 540 is a machine learning model. For example, a deep neural network model.

In some embodiments, an input of the second parameter determination model 540 may include the temperature stratification data 530 or the like, and an output may include a second flow compensation parameter 550.

In some embodiments, the second parameter determination model 540 may be obtained through training a large number of fifth training samples with a fifth label.

In some embodiments, the fifth training sample may include sample temperature stratification data and the fifth training sample may be obtained through historical data. In some embodiments, the fifth label is a historical second flow compensation parameter corresponding to the fifth training sample, and the fifth label may be determined by a processor or manually marked.

In some embodiments, the output of the temperature stratification prediction model 520 may be the input of the second parameter determination model 540. In some embodiments, the temperature stratification prediction model 520 may be obtained through a joint training with the second parameter determination model 540.

An exemplary process of the joint training includes: inputting the fourth training sample into an initial temperature stratification prediction model, obtaining temperature stratification data output by the initial temperature stratification prediction model, and inputting an output of the initial temperature stratification prediction model into an initial second parameter determination model to obtain the second flow compensation parameter. According to an output of the initial second parameter determination model and the fifth label, a loss function is constructed, and parameters of the initial temperature stratification prediction model and parameters of the initial second parameter determination model are updated at the same time, and the training is completed until a preset condition is satisfied. The preset condition may be that the loss function is smaller than a threshold, the loss function converges, or a training period reaches a threshold.

In some embodiments of the present disclosure, the joint training can solve the difficulty in obtaining labels when training the temperature stratification prediction model alone, and improve the training effect.

In some embodiments of the present disclosure, determining the temperature stratification data and the second flow compensation parameter by the temperature stratification prediction model and the second parameter determination model can obtain better results than determining the second flow compensation parameter directly based on historical data, and further improve the accuracy of the temperature stratification data0 while improving efficiency and saving human and time costs.

In some embodiments, the smart gas device management platform may further obtain a preset time period; determine at least one reference compensation parameter according to monitoring data at at least one time point within the preset time period; determine the second flow compensation parameter based on the at least one reference compensation parameter.

The preset time period refers to a historical time range before the current time point. In some embodiments, a duration of the preset time period may be the same or different depending on a current moment.

The preset time period may be determined in various ways. For example, the preset time period may be preset by the system or by humans.

In some embodiments, the smart gas device management platform may obtain the preset time period from a vector database.

In some embodiments, the smart gas device management platform may construct a second feature vector based on a time distribution and weather data, search in the vector database based on the second feature vector, determine a second associated feature vector, and determine a reference time period corresponding to the second associated feature vector as the preset time period.

The time distribution refers to different time periods composed of consecutive a plurality of time points. For example, the time distribution may include morning, noon, afternoon, or night. Different time distributions correspond to different ranges of light changes and environmental temperature changes.

In some embodiments, vectors in the vector database may include a plurality of second reference feature vectors and reference time periods corresponding to the corresponding to the. The second reference feature vector is constructed based on a historical time distribution and historical weather data. It should be noted that the vector database used to determine the preset time period herein is different from the vector data used to determine the flow rate compensation parameter in the above.

In some embodiments, the smart gas device management platform may determine an evaluation value of each second feature vector and an evaluation value of each second reference feature vector in the vector database. The evaluation value may be used to evaluate how well the second reference feature vector matches the second feature vector. A higher evaluation value indicates a higher degree of matching between the second reference feature vector and the second feature vector. In some embodiments, the evaluation value may be the reciprocal of a vector distance between the second reference feature vector and the second feature vector.

In some embodiments, the smart gas device management platform may determine a second reference feature vector corresponding to a maximum evaluation value as the second associated feature vector.

In some embodiments of the present disclosure, establishing a vector database based on historical data and searching in the vector database can obtain a reasonable preset time period relatively quickly.

In some embodiments, the preset time period is also related to a change in the gas transportation feature and the environmental feature.

In some embodiments, when the smart gas device management platform detects a sudden change in an environmental temperature, weather data, a gas flow rate, a gas temperature, etc. (a change value is greater than a preset threshold), the preset time period may be shortened.

In some embodiments of the present disclosure, adjusting the preset time period in real time according to an environmental factor can avoid the impact of an environmental mutation on monitoring data, make a reference compensation parameter obtained based on the monitoring data more reliable, and further improve the accuracy of the second flow compensation parameter.

In some embodiments, the smart gas device management platform may determine the second flow compensation parameter in multiple ways based on the at least one reference compensation parameter. For example, the smart gas device management platform may perform an average calculation on a plurality of reference compensation parameters, and determine an average value of the average calculation of the plurality of reference compensation parameters as the second flow compensation parameter. The average calculation may be an arithmetic average or a weighted average. A weight of the weighted average is related to a distance between a time point corresponding to the reference compensation parameter and the current time point. When the time point corresponding to the reference compensation parameter is closer to the current time point, the weight is greater.

In some embodiments of the present disclosure, obtaining the second flow compensation parameter based on data at a single time point may result in a large error due to sudden changes in the environment. In order to reduce measurement errors, the second flow compensation parameter is determined based on reference compensation parameters in consecutive time periods, which can improve the accuracy of the second flow compensation parameter.

It should be noted that the above descriptions of the process are only for illustration and description, and do not limit the scope of application of the present disclosure. For those skilled in the art, various modifications and changes can be made to the process under the guidance of the present disclosure. However, such modifications and changes are still within the scope of the present disclosure.

One or more embodiments of the present disclosure also provide a computer-readable non-transitory storage medium storing computer instructions, and when a computer reads the instructions stored in the storage medium, the computer executes a method for compensating ultrasonic metering based on a smart gas Internet of Things system the present disclosure.

The basic concepts have been described above, obviously, for those skilled in the art, the above detailed disclosure is only an example and does not constitute a limitation to the present disclosure. Although not expressly stated here, those skilled in the art may make various modifications, improvements, and corrections to the present disclosure. Such modifications, improvements, and corrections are suggested in the present disclosure, so such modifications, improvements, and corrections still belong to the spirit and scope of the exemplary embodiments of the present disclosure.

Meanwhile, the present disclosure uses specific words to describe the embodiments of the present disclosure. For example, "one embodiment", "an embodiment", and/or "some embodiments" refer to a certain feature, structure, or characteristic related to at least one embodiment of the present disclosure. Therefore, it should be emphasized and noted that two or more references to "an embodiment" "an embodiment" or "an alternative embodiment" in different places in the present disclosure do not necessarily refer to the same embodiment. In addition, certain features, structures, or feature in one or more embodiments of the present disclosure may be properly combined.

In addition, unless explicitly stated in the claims, the order of processing elements and sequences described in the present disclosure, the use of numbers and letters, or the use of other names are not used to limit the sequence of processes and methods in the present disclosure. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the implementation of various components described above may be embodied in a hardware device, it may also be implemented as a software-only solution, e.g., an installation on an existing server or mobile device.

In the same way, it should be noted that in order to simplify the expression disclosed in the present disclosure and help the understanding of one or more embodiments of the invention, in the foregoing description of the embodiments of the present disclosure, sometimes multiple features are combined into one embodiment, drawings, or descriptions thereof. This method of disclosure does not, however, imply that the subject matter of the present disclosure requires more features than are recited in the claims. Rather, claimed subject matter may lie in less than all features of a single foregoing disclosed embodiment.

In some embodiments, numbers describing the number of components and attributes are used. It should be understood that such numbers used in the description of the embodiments use the modifiers "about", "approximately" or "substantially" in some examples. Unless otherwise stated, "about", "approximately" or "substantially" indicates that the stated figure allows for a variation of ±20%. Accordingly, in some embodiments, the numerical parameters used in the present disclosure and claims are approximations that can vary depending on the desired feature of individual embodiments. In some embodiments, numerical parameters should take into account the specified significant digits and adopt a general digit reservation manner. Although the numerical ranges and parameters used in some embodiments of the present disclosure to confirm the breadth of the range are approximations, in specific embodiments, such numerical values are set as precisely as practicable.

Each patent, patent application, patent application publication, and other material, such as article, book, disclosure, publication, document, etc., cited in the present disclosure is hereby incorporated by reference in its entirety. Historical application documents that are inconsistent with or conflict with the content of the present disclosure are excluded, and documents (currently or later appended to the present disclosure) that limit the broadest scope of the claims of the present disclosure are excluded. It should be noted that if there is any inconsistency or conflict between the descriptions, definitions, and/or terms used in the accompanying materials of the present disclosure and the contents of the present disclosure, the descriptions, definitions, and/or terms used in the present disclosure shall prevail.

Finally, it should be understood that the embodiments described in the present disclosure are only used to illustrate the principles of the embodiments of the present disclosure. Other modifications are also possible within the scope of the present disclosure. Therefore, by way of example and not limitation, alternative configurations of the embodiments of the present disclosure may be considered consistent with the teachings of the present disclosure. Accordingly, the embodiments of the present disclosure are not limited to the embodiments explicitly introduced and described in the present disclosure.

What is claimed is:

1. A method for compensating ultrasonic metering based on a smart gas Internet of Things system, wherein the method is implemented based on a system for compensating ultrasonic metering, and the method is executed by a smart gas device management platform, comprising:
   determining a first preset condition based on a gas pipeline feature obtained from an external database, wherein the first preset condition refers to a judgment condition for evaluating whether a flow compensation is required;

obtaining a gas transportation feature and an environmental feature based on at least one sensor; and determining a compensation scheme based on the gas transportation feature, the environmental feature and the first preset condition, wherein the compensation scheme includes at least one of a flow rate compensation coefficient, a flow compensation parameter, a temperature compensation coefficient, or a pressure compensation coefficient, wherein the determining a compensation scheme includes:

in response to the gas transportation feature and the environmental feature satisfying the first preset condition, determining the flow rate compensation coefficient as the compensation scheme;

in response to the gas transportation feature and the environmental feature not satisfying the first preset condition, determining the compensation scheme as a combination of the flow rate compensation coefficient and the flow compensation parameter; and sending the compensation scheme to an ultrasonic metering device and controlling the ultrasonic metering device to determine updated flow metering data according to the compensation scheme.

2. The method according to claim 1, wherein the flow compensation parameter includes a first flow compensation parameter and a second flow compensation parameter; the determining a compensation scheme based on the gas transportation feature, the environmental feature and the first preset condition further includes:

in response to the gas transportation feature and the environmental feature not satisfying the first preset condition, determining temperature stratification data;

determining the compensation scheme based on the temperature stratification data and a second preset condition, wherein the second preset condition refers to a judgment condition for determining content contained in the compensation scheme; and in response to the temperature stratification data satisfying the second preset condition, determining the compensation scheme as a combination of the first flow compensation parameter and the flow rate compensation coefficient; or in response to the temperature stratification data not satisfying the second preset condition, determining the compensation scheme as a combination of the second flow compensation parameter and the flow rate compensation coefficient.

3. The method according to claim 2, further comprising:

determining the temperature stratification data through a temperature stratification prediction model based on a gas pipeline feature, a gas transportation feature, and an environmental feature at a current time point, and the temperature stratification prediction model being a machine learning model; and in response to the gas transportation feature and the environmental feature satisfying a third preset condition, determining the second flow compensation parameter based on the temperature stratification data.

4. The method according to claim 3, wherein the determining the second flow compensation parameter based on the temperature stratification data includes:

determining the second flow compensation parameter through a second parameter determination model based on the temperature stratification data, the second parameter determination model being a machine learning model.

5. The method according to claim 3, wherein the determining the second flow compensation parameter based on the temperature stratification data further includes:

obtaining a preset time period;

determining at least one reference compensation parameter according to monitoring data at at least one time point within the preset time period; and determining the second flow compensation parameter based on the at least one reference compensation parameter.

6. The method according to claim 1, wherein the gas transportation feature includes at least one of a gas flow rate, a gas temperature, or a gas pressure, and the environmental feature includes at least one of an environmental temperature or an environmental pressure;

the determining a compensation scheme based on the gas transportation feature, the environmental feature, and the first preset condition includes:

calculating the flow rate compensation coefficient according to a preset algorithm based on the gas flow rate, the environmental temperature, and the gas temperature.

7. The method according to claim 1, further comprising:

obtaining target monitoring data at a target time point, a first monitoring data sequence within a first preset time period, and a second monitoring data sequence within a second preset time period, the monitoring data including at least one of the gas transportation feature or the environmental feature;

judging whether the target monitoring data being interference data based on the first monitoring data sequence and the second monitoring data sequence; and in response to the target monitoring data being the interference data, processing the interference data.

8. The method according to claim 7, wherein the judging whether the target monitoring data being interference data based on the first monitoring data sequence and the second monitoring data sequence includes:

judging whether the target monitoring data being the interference data through an interference data determination model based on the first monitoring data sequence, the second monitoring data sequence, and the target monitoring data, and the interference data determination model being a machine learning model.

9. A computer-readable non-transitory storage medium storing computer instructions, wherein a computer operates a method for compensating ultrasonic metering based on a smart gas Internet of Things system according to claim 1 when reading the computer instructions.

10. A system for compensating ultrasonic metering based on a smart gas Internet of Things system, wherein the system includes a smart gas user platform, a smart gas service platform, a smart gas device management platform, a smart gas sensor network platform, and a smart gas object platform that are connected in sequence;

the smart gas user platform is configured to send a query instruction of parameter management information of a gas device to the smart gas device management platform through the smart gas service platform;

the smart gas device management platform is configured to send an instruction for obtaining relevant data on the gas device to the smart gas object platform through the smart gas sensor network platform in response to the query instruction of the parameter management information of the gas device, receive relevant data on the gas device uploaded by the smart gas object platform; process the relevant data on the gas device to obtain management information of the gas device; upload the management information of the gas device to the smart gas user platform through the smart gas service platform;

the relevant data on the gas device at least includes a gas pipeline feature, a gas transportation feature, and an environmental feature, and the management information of the gas device at least includes a compensation scheme for compensating flow metering data of an ultrasonic metering device, and a process of determining the compensation scheme includes:

determining a first preset condition based on the gas pipeline feature obtained from an external database, and the first preset condition refers to a judgment condition for evaluating whether a flow compensation is required;

obtaining the gas transportation feature and the environmental feature based on at least one sensor; and determining a compensation scheme based on the gas transportation feature, the environmental feature and the first preset condition, and the compensation scheme includes at least one of a flow rate compensation coefficient, a flow compensation parameter, a temperature compensation coefficient, or a pressure compensation coefficient, wherein the determining a compensation scheme includes:

in response to the gas transportation feature and the environmental feature satisfying the first preset condition, determining the flow rate compensation coefficient as the compensation scheme; and in response to the gas transportation feature and the environmental feature not satisfying the first preset condition, determining the compensation scheme as a combination of the flow rate compensation coefficient and the flow compensation parameter.

* * * * *